US007046247B2

(12) United States Patent
Hao et al.

(10) Patent No.: US 7,046,247 B2
(45) Date of Patent: May 16, 2006

(54) METHOD FOR VISUALIZING GRAPHICAL DATA SETS HAVING A NON-UNIFORM GRAPHICAL DENSITY FOR DISPLAY

(75) Inventors: Ming C. Hao, Palo Alto, CA (US); Umeshwar Dayal, Saratoga, CA (US); Daniel Cotting, Zuerich (CH); Markus Gross, Uster (CH); Thomas Holenstein, Zuerich (CH); Brian Ono, Fremont, CA (US); Alan Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 10/146,974

(22) Filed: May 15, 2002

(65) Prior Publication Data

US 2003/0214504 A1   Nov. 20, 2003

(51) Int. Cl.
*G06T 11/20* (2006.01)
*G09G 5/00* (2006.01)
(52) U.S. Cl. .................................. 345/440; 345/660
(58) Field of Classification Search ............... 345/440, 345/440.1, 440.2
See application file for complete search history.

(56) References Cited

U.S. PATENT DOCUMENTS

| 6,100,901 A * | 8/2000 | Mohda et al. ............... 345/440 |
| 6,212,509 B1 * | 4/2001 | Pao et al. .................... 706/16 |
| 6,219,052 B1 * | 4/2001 | Gould ......................... 345/661 |
| 6,226,408 B1 * | 5/2001 | Sirosh ......................... 382/224 |
| 6,295,514 B1 * | 9/2001 | Agrafiotis et al. ........... 703/12 |
| 6,424,965 B1 * | 7/2002 | Wylie ........................... 707/2 |
| 2003/0030637 A1 * | 2/2003 | Grinstein et al. ........... 345/420 |
| 2003/0044061 A1 * | 3/2003 | Prempraneerach et al. . 382/164 |
| 2003/0142094 A1 * | 7/2003 | Zhang .......................... 345/440 |
| 2003/0214504 A1 * | 11/2003 | Hao et al. .................... 345/440 |

OTHER PUBLICATIONS

Yang, Li, "Interactive Exploration of Very Large Relational Datasets through 3D Dynamic Projections", Aug. 2000.*
Woodruff, Allison et al, "Constant Density Visualizations of Non-uniform Distributions of Data", Nov., 1998.*
Woodruff, Allison et al, "Constant Information Density in Zoomable Interfaces", Nov., 1999.*

* cited by examiner

*Primary Examiner*—Ryan Yang

(57) ABSTRACT

A method for visualizing high density graphical data sets for display is effectuated by determining the graphical density corresponding to an area of the display, where the graphical density is of a non-uniform nature. A non-linear visual space transformation corresponding to the graphical density is processed. Resolution in the area of the display is increased in response to the non-linear visual space transformation and the area is displayed with increased resolution.

19 Claims, 12 Drawing Sheets

200

Start

↓

Determine Graphical Density Corresponding to an Area of Data as Displayed
201

↓

Transform Distances Connecting Data Items
202

↓

Transform Local Scale Reflecting Similarity Values Between Data Items
203

↓

Display Area with Increased Resolution
204

↓

Done

Fig. 2B

Before Stretching  300A

Stretching A High-Density Area

After Stretching  300B

METHOD FOR VISUALIZING GRAPHICAL DATA SETS HAVING A NON-UNIFORM GRAPHICAL DENSITY FOR DISPLAY

BACKGROUND OF THE INVENTION

1. Field of the Invention

The present invention relates to the field of visual and graphical displays for the representation of data. Specifically, the present invention relates to a method for visualizing high density graphical data for display.

2. Related Art

Modern computer systems and other media for accessing and interacting with information typically display data visually in various graphical formats. Visually displayed graphically formatted data is an important medium in many fields. These fields include electronically based commerce and business, also known as e-commerce and e-business, operations research, epidemiology, information technology (IT) network administration and engineering, and a wide-ranging host of others.

The are numerous examples of applications of visually displayed graphically formatted data in these fields. E-business relies heavily on market basket analysis and customer profiling. IT depends on management of its various resources. Further, e-commerce often tasks IT extensively, including management of its resources. Epidemiologists look for correlations between different diseases, and/or between diseases and a host of environmental factors. Such practical fields rely on real world data, e.g., data reflecting information that is based in reality. The field of e-commerce provides the following example of application of crucial real world data in market basket analysis.

Market basket analysis has become a key success factor in e-commerce. Effective market basket analysis methods employ association and clustering as methods of analyzing such data. E-commerce transactions often are comprised of several products (e.g., items) that are purchased together. An example of such an association is the fact that 85% of the people who buy a printer also buy paper. Understanding these relationships across hundreds, even thousands of product lines and among millions of transactions provides visibility and predictability into product affinity purchasing behavior.

Contemporarily, some technologies allow the visualization of associations for commercial entities such as retail stores and others, to make business decisions, such as product recommendations, cross selling, store shelf arrangements, and a host of others. As illustrated in Prior Art FIG. 1A, one conventional technique for visualizing associations is a matrix display. Matrix display technique positions pairs of items on separate axes to visualize the strength of their relationships. One such association visualizer lays out the rules on a 3D grid landscape. Visual filtering and querying allow users to focus in on selected rules. However, to visualize many, sometimes millions of association rules, association matrixes are too restrictive. The number of rules shown at the same time needs to be pre-decided. Further, the number of rules is limited to a small range, e.g., on the order of 10–20.

An alternative conventional technique involves laying out associations on a graph, as depicted in Prior Art FIG. 1B. Such associations between these data are known in the art as edges. One such contemporary technology uses an individual purchase history to make suggestions to shoppers based on a graph. However, when the number of items grows large, the graph can quickly become cluttered with many interactions, e.g., too many edges appear to be useful to most analysts attempting to glean relevant information from such a graph. Also, associated items may not be placed close together, such that their edges graphically become tenuous. The market analysis graph of one contemporary technology has achieved some improvement by utilizing dynamic queries and presentations.

Besides their application in data associations, graph visualization methods have become useful in information visualization. One such technique uses cone trees and their hyperbolic projections. These are utilized for web and file system visualization. Another such technique uses fast graph layout to display various types of statistical data. A central approach to such graph visualization techniques exploits physics-based paradigms. Recent conventional techniques apply clustering algorithms to improve performance and scalability of such physics-based methods.

In spite of the advances in the field, it is still difficult to mine and visualize customer's purchasing behavior from millions of Internet transactions. As the volume of e-commerce data grows and as the transaction data is integrated into off-line data, new data visualization associations are required to extract useful and relevant information.

With such real world information, seldom is the data distribution uniform. In the real world, the distribution of data may often be stochastic, variable, and/or dynamic. The graphical density of such data is accordingly also not uniform. The graphical display of such data has consequences arising from its often non-uniform nature. These consequences are problematic for visualization, e.g., for conveying graphical meaning from such data to a user viewing it.

One such problematic consequence is that graphical clutter, in which the data are densely concentrated visually in a confusingly tight, seemingly disordered array. Another such problematic consequence is graphical sparsity, in which the data are exiguously dispersed visually in a loose, seemingly unconnected array.

Often, graphical clutter results in overplotting, e.g., certain data items are not visible and the overall structure gets lost. Clutter results in extraordinarily dense clusters of graphical data. Such clusters are often too close to each other, or even penetrate each others boundaries. These conditions render a user's visual navigation among these data extraordinarily difficult, undermining or even precluding significant mining of information via visualization.

Graphical sparsity, on the other hand, results in inefficient use of the available display space. Significant data may graphically be so far separated on a display screen that relationships between them are difficult for a user to spot, and concomitantly easy to miss. This renders mining errors and information losses probable. Further, data may graphically be so far separated from each other that a given display screen may not present them simultaneously, exacerbating the probability of mining errors and data loss.

Thus, for users of graphically displayed data, both graphical clutter and graphical sparsity may be confusing and/or make it difficult for a user to glean meaning from graphical information presentations so cluttered and/or sparse. However, a further related problematic consequence appears from both. This is that often, both graphical clutter and graphical sparsity appear together in different portions of the same visual display of data. The individual drawbacks of both graphical clutter and graphical sparsity are thus compounded, exacerbating the difficulty users such as analysts have in extracting useful information from displayed data.

Conventional approaches to alleviating these difficulties include partial capitulation. This is achieved in one technique by reducing the amount of information displayed. In another technique, data is distilled by the use of filters. However, these approaches are problematic, in and of themselves. Capitulatory techniques such as these are problematic because they inherently decrease the amount of information available for analysis, e.g., they are content limiting.

Another conventional approach to alleviating graphical cluttering and/or graphical sparsity include constraining the display of information by segregating data according to different levels of analytical interest. However, this approach is also fraught with the problem of content limitation.

Yet another such conventional approach applies multiple visual representations, each with differing amounts of detail, or varying the amounts of detail to effectuate subsequent visual representations. A further conventional approach attempts to ameliorate the problematic cluttering effects by reducing a high-density graph. In this approach, the high density graph is reduced by supporting multiple graphical representations of data items.

One further conventional technique is the use of a zoom function for the graphical display. However, as the object gets larger, it occupies a larger percentage of the display and does not reduce the complexity of the graph. Further, the zoom-enhanced portion either covers non-enhanced portions of the graphical representation or pushes non-enhanced portions of the graphical representation out of the displayable viewing area of the display monitor. Either action results in rendering the non-enhanced portions of the graphical representation unavailable for simultaneous viewing with the zoom-enhanced portion.

In as much as the immediately foregoing conventional approaches may yield graphical data displays with less detail displayed of the data therein, or hidden and/or displaced graphical data, these conventional approaches also limit content, and are thus problematic from this perspective. However, these conventional techniques are further problematic for two reasons.

First, a user attempting to mine data using these conventional techniques must separate the representations, thus having to analyze them separately. This is confusing, time consuming, and labor intensive for analysts applying the techniques. Second, in forcing the user analyst to separate his informational representations based on their individually varying degree of detail, contextual relationships between the data may be lost.

Thus, the user suffers not simply loss of informational content available in his graphical display of data, but further suffers a lose of context, which in many modern analytical applications may cause lose of crucial information. Individually, combining the consequences of loss of content and loss of context is serious enough. However, combining the effects of each loss may amplify the significance of both losses in a manner worse than simple arithmetic addition, such that the total loss of analytical value is much greater in certain situations.

To visually represent non-uniform data with a wide range of values to analysts who must make use of them, optimization of scaling is desirable. Yet another conventional approach, which attempts to so optimize data scaling, is the application of a pseudo coloring scheme to the display of edges between data. However, such pseudo coloring schemes fail as, for instance, all the similarity edges are colored identically or nearly so, due to the non-uniformed dataset.

SUMMARY OF THE INVENTION

A method for visualizing high density graphical data sets for display is effectuated by determining the graphical density corresponding to an area of the display, where the graphical density is of a non-uniform nature. A non-linear visual space transformation corresponding to the graphical density is processed. Resolution in the area of the display is increased in response to the non-linear visual space transformation and the area is displayed with increased resolution.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

FIG. 2B is a flowchart of the operation of a visual mining platform, in accordance with one embodiment of the present invention.

DETAILED DESCRIPTION OF THE INVENTION

In the following detailed description of embodiments of the present invention, numerous specific details are set forth in order to provide a thorough understanding of the present invention. However, it will be recognized by one skilled in the art that the present invention may be practiced without these specific details or with equivalents thereof. Embodiments of the present invention are discussed primarily in the context of a method for generating graphical data for display. In one embodiment, a method and system for visualization of high density three dimensional graphs, using non-linear visual space transformations is effectuated.

Figure 1A:
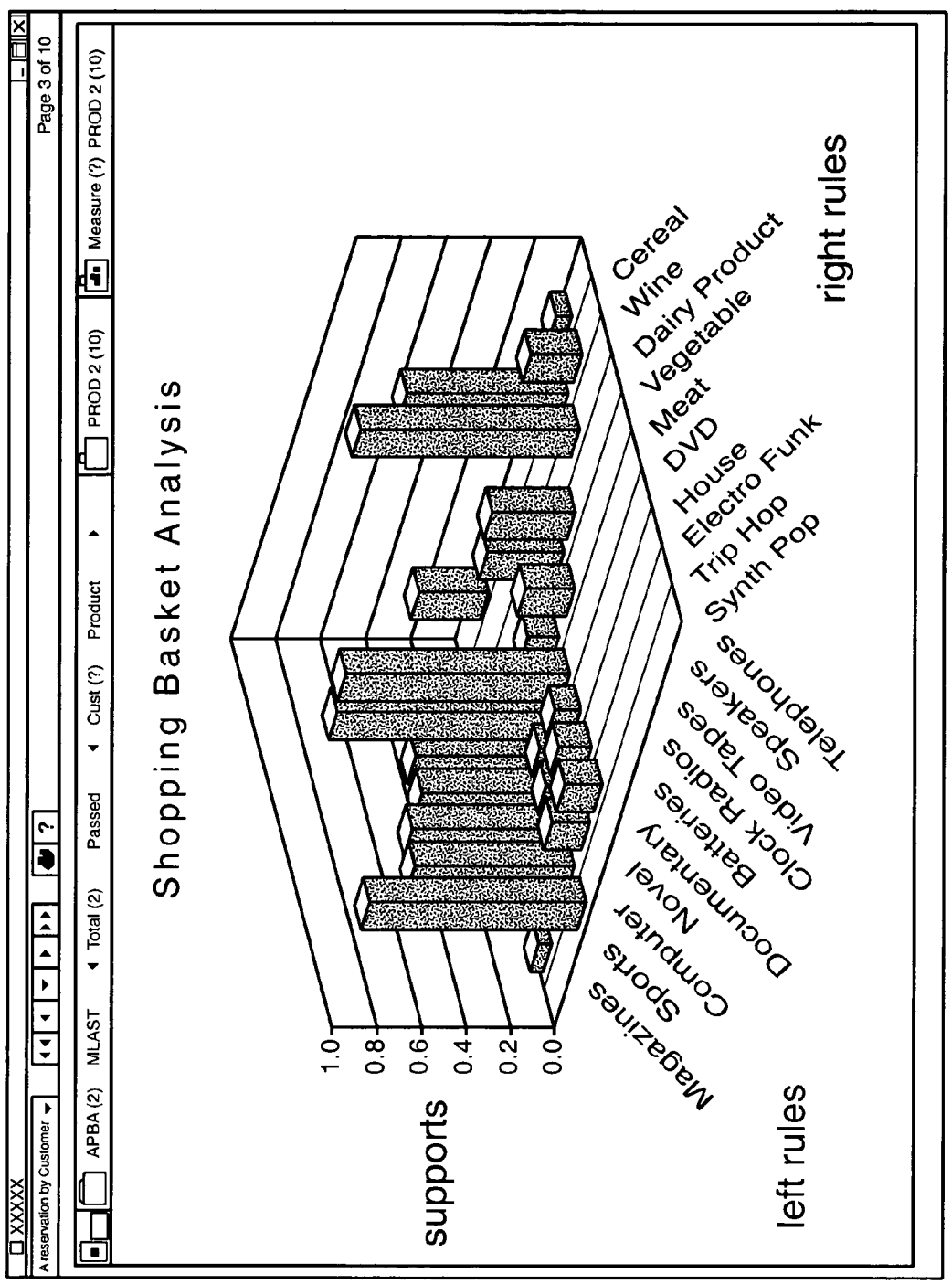
FIG. 1A depicts a pseudo screen shot of a matrix display of data on a computer monitor, comporting with the prior art.
Figure 1B:
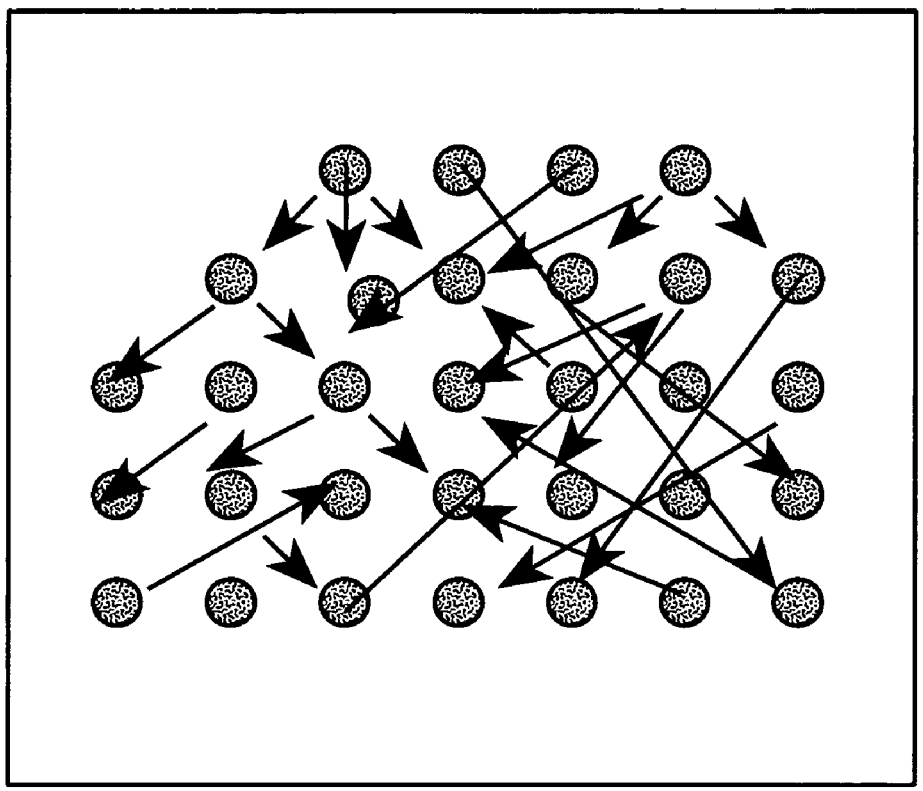
FIG. 1B depicts a graphical lay out of associations between data, comporting with the prior art.
Figure 2A:
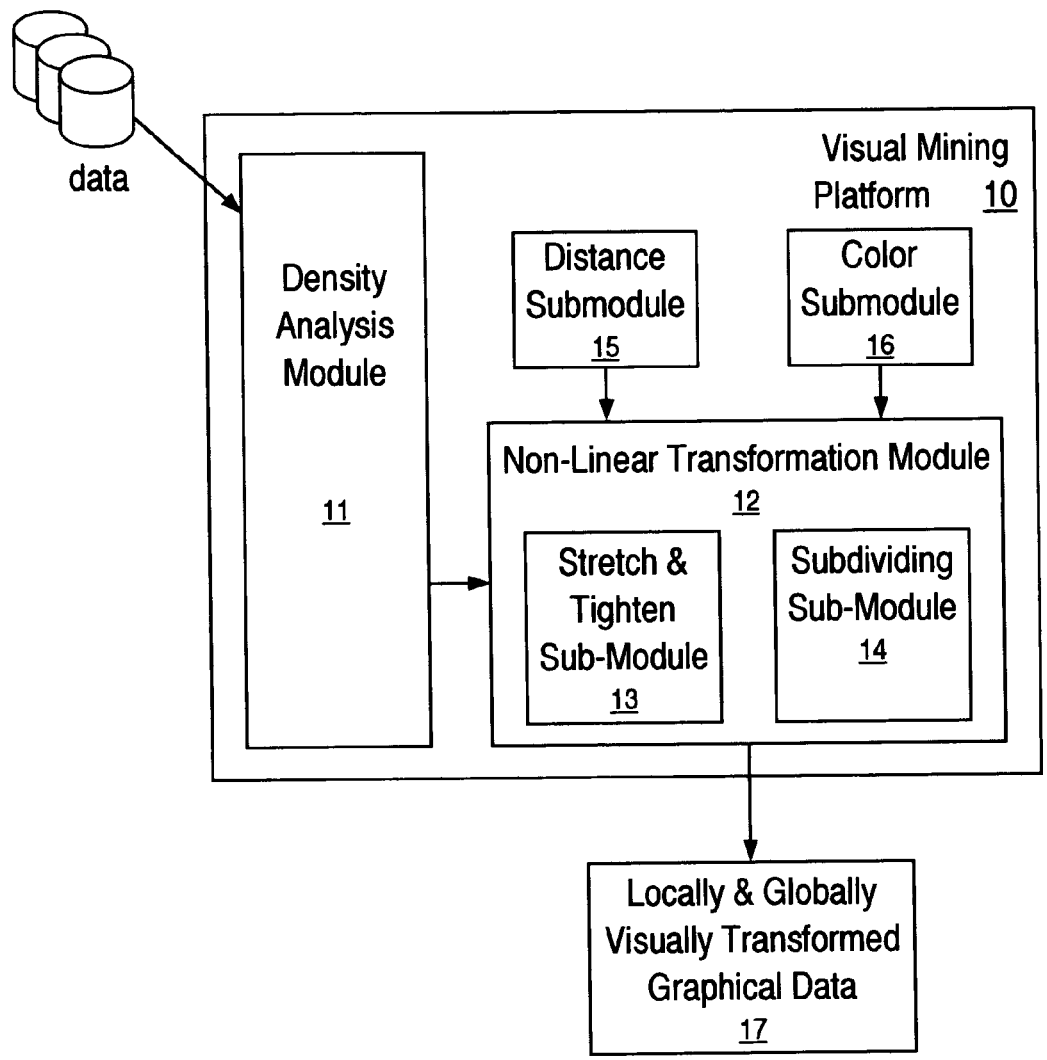
FIG. 2A depicts a visual mining platform, in accordance with one embodiment of the present invention.

With reference to FIG. 2A, an automated visual mining platform 10 is depicted, in accordance with one embodiment of the present invention. In one embodiment, automated visual mining platform 10 is a software system implemented in a computer system. The computer system that embodies the automated visual mining platform 10 can be any kind of computer system. For example, the computer system can be a workstation computer system, a personal computer system, a main-frame computer system, or a supercomputer system. In one embodiment, the computer system is a server system.

The operation of automated visual mining system 10 effectuates a process 200, which is explained with reference to FIG. 2B simultaneously. As an input, automated visual mining system 10 receives graphical data having areas of various density, including a high density area. Within visual mining platform 10, a density analysis module 11 receives the data, and in step 201, examines the data and calculates the density of data distribution within it. Visual mining platform 10 applies, in one embodiment, Java-based multi-threaded parallelism to effectuate non-linear visual space transformation.

Density analysis module 11 then sends the data, including the calculated densities, to a non-linear transformation module 12. Non-linear transformation module 12 also receives input from a distance sub-module 15 and from a color sub-module 16. Distance sub-module 15 and from a color sub-module 16 assist non-linear transformation module 12 with performing non-linear visual space transformation on both a global and a local scale.

Non-linear visual space transformation is performed in both a stretch and tighten sub-module 13 and a subdividing sub-module 14. In step 202, stretching and tightening sub-module 13 adjusts the distances between data items, which represent the relationship between each pair of data items, to render these relationships more visually apparent to a data analyst. In step 203, subdividing sub-module 14 performs color (or other) transformations to optimize scaling and render the similarity value between each pair of data items more visually apparent. Non-linear transformation module then outputs locally and globally visually transformed graphical data 15. In step 204, this output displays the data area with increased resolution, advantageously promoting visual data mining.

Figure 2C:
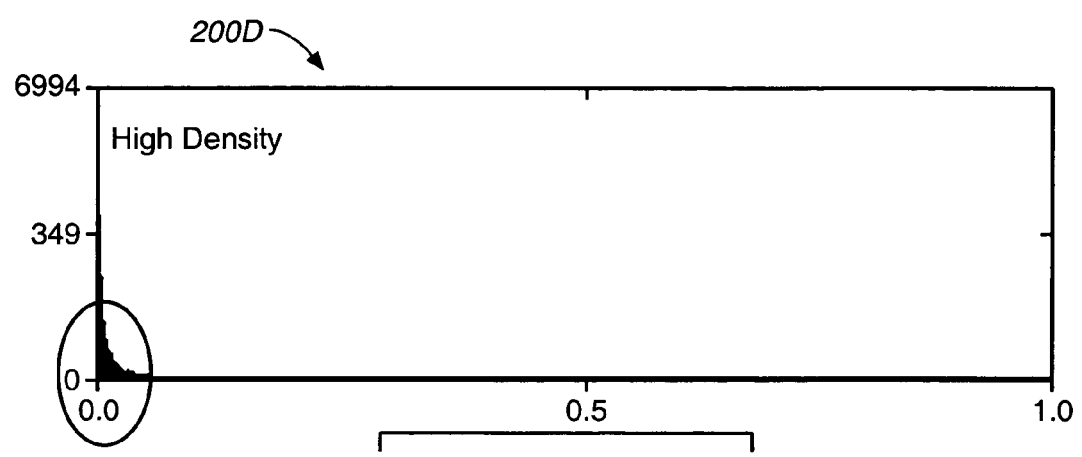
FIG. 2C is a histogram representing data densities of electronic market transactions, in accordance with one embodiment of the present invention.

The graphical density corresponding to various areas of data as displayed, for example on a computer monitor is determined, in one embodiment, by a calculation. This determination can involves, in one embodiment, the generation of a histographic representation. FIG. 2C depicts an exemplary histogram 200C of data densities.

Histogram 200C represents data densities collated from an exemplary series of e-commerce transactions subject to a market basket analysis, in accordance with one embodiment of the present invention. The present exemplary series numbers 355,776 transactions on 959 different products. Histogram 200B is employed for calculating the density of data distribution.

Horizontal axis $200x$ posits the relative density of these data points on the display. The x-axis $200x$ represents the relationships between items in the range of (0, 1). In the present embodiment, a market basket analysis is depicted. In the exemplary market basket analysis, the tightness of the relationship is computed from the frequency of purchasing product items together.

Figure 3A:
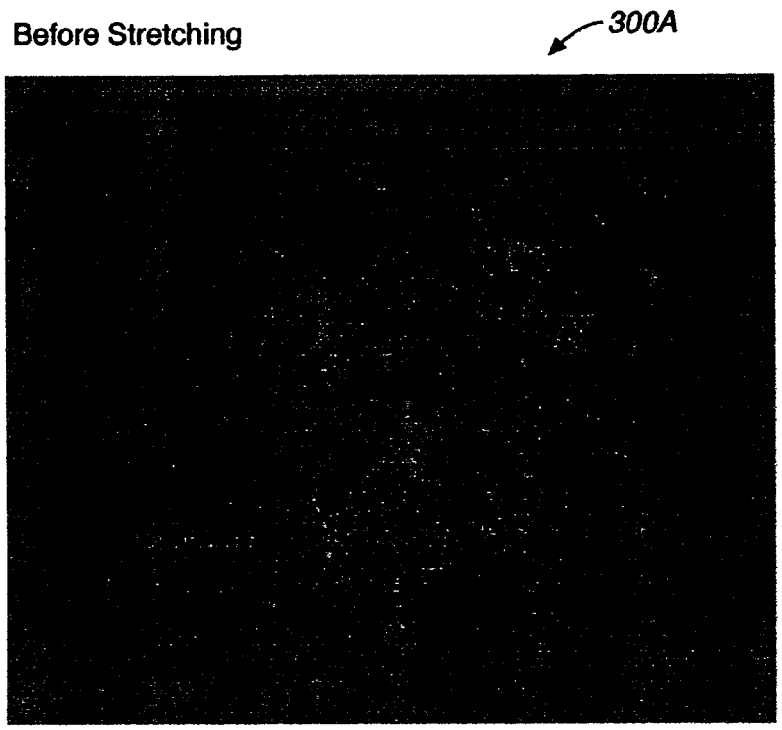
FIG. 3A depicts a graph generated from a relation-based mass-spring visualization of the data represented in the histogram depicted in FIG. 2, showing a high density area (circled), wherein data clusters crowd, occlude, and penetrate each other, amenable to an embodiment of the present invention.

The y-axis represents the number of edges. The relative density is plotted as increments of relative distance between each data point, on a scale. The scale runs from zero (0.0), representing zero separation, e.g., contact between data points, to one (1.0), representing separation by a distance equivalent to the extremes of the display. Vertical axis $200y$ posits each transaction as individual data points of the total population of 355,776. Each individual point is to be visually represented on a proposed graphical display (e.g., plot 300A; FIG. 3A).

As illustrated in FIG. 2C, the data is not evenly distributed in the range of (0, 1) (left side of scale) and cluttered in the area of 0.02. Nearly the entire exemplary transactional population is seen to be concentrated in this circled region 205. Exemplary histogram 200B represents the density of the similarities among all the related data items extracted from the web transaction data. As illustrated in FIG. 2B, the density of the graph on the left side in FIG. 2B, especially in circled region 205, is very high. Most of the data items are cluttered together in an area of the similarities close to 2.2%. Exemplary histogram 200B will be used to divide a display screen into N density regions corresponding to the densities depicted in the histogram 200C.

A function corresponding to the graphical density determined is then processed. In one embodiment, this function is a spatial transformation. In one embodiment, the spatial transformation is a non-linear visual space transformation. For example, an area of high density may be stretched, and an area of lower density may be compressed (e.g., FIGS. 3A, 3B), advantageously achieving a better level of visual clarity on a global scale with respect to the display as a whole. The resolution of the data displayed in the area is increased in response to the function processed for that particular area. The area is displayed with increased resolution.

With reference to FIG. 3A, a graph 300A is generated, in one embodiment, by a conventional relation-based mass-spring visualization of the data plotted by histogram 200B (FIG. 2B). This graph 300A visually depicts data relationships of varying densities. One especially high density area 301A appears in graph 300A, with a large amount of cluttering shown.

This cluttered high-density area 301A appears circled and labeled herein "cluttered." Clusters of data therein are very close to each other, some clusters penetrating other clusters. The very cluttered visualization is hard to navigate. In addition, data similarities therein are not fully reflected by the computed values. Another set of data relationships is depicted herein by the triangular convergence of edges 303A. Thus, mining data and/or otherwise gleaning information from graph 300A in general, and especially from high density cluttered area 301A is difficult, as in the prior art. However, in accordance with one embodiment of the present invention, a novel technique employs automatic Non-Linear Visual Space Transformations (NLVST) to visually modify graphical representation 300A as follows.

After employing a histogram (e.g., histogram 200B; FIG. 2B) to calculate the density of data distribution, NLVST automatically maps the raw data values, e.g., similarities, from the current density to a logarithmic scale. This automatic mapping results in stretching the high-density area 301A. This method visually separates the data clusters, thus preventing the clusters from getting too close to each other, e.g., clutter is hindered, under certain circumstances eliminated entirely.

Figure 3B:
FIG. 3B depicts a graph generated in association with the data depicted in FIG. 3A, showing a high density area (circled), wherein the high density area is stretched by non-linear visual space transformations, in accordance with one embodiment of the present invention.

With reference now to FIG. 3B, a resultant three dimensional (3D) graph 300B depicts the data relationships after visual space stretching. This includes an visual enhancement of the high density area 301A (FIG. 3A) into an enhanced area 301B, circled herein and marked "enlarged." Similarly, the set of data relationships depicted as a clutter dominated triangular convergence of edges 301A (FIG. 3A) is also seen herein as an enhanced triangular set of edge represented data relationships 303B.

NLVST also tightens the sparse area 302B to save the display space. Thus, actual visual transformation takes place in a manner wherein relational strength is transformed into graphical stiffness, e.g., degree of distance/proximity. In this way, graphical distance and/or proximity visually indicates the strength of the relationship between data items. The result of the transformed graph 301B is consistent with the data contained within graph 301A (FIG. 3A); the relationships among clusters remain unchanged. It is simply easier to visualize.

Advantageously however, the NLVST enhanced graph 300B is no longer visually cluttered. It is correspondingly easy to navigate. Further, data similarities therein are fully reflected by the computed values. Thus, mining data for analysis and/or otherwise gleaning information from graph 300B, including from high density cluttered area 301B and enhanced triangular set of edge represented data relationships 303B is greatly simplified and enhanced.

Figure 4A:
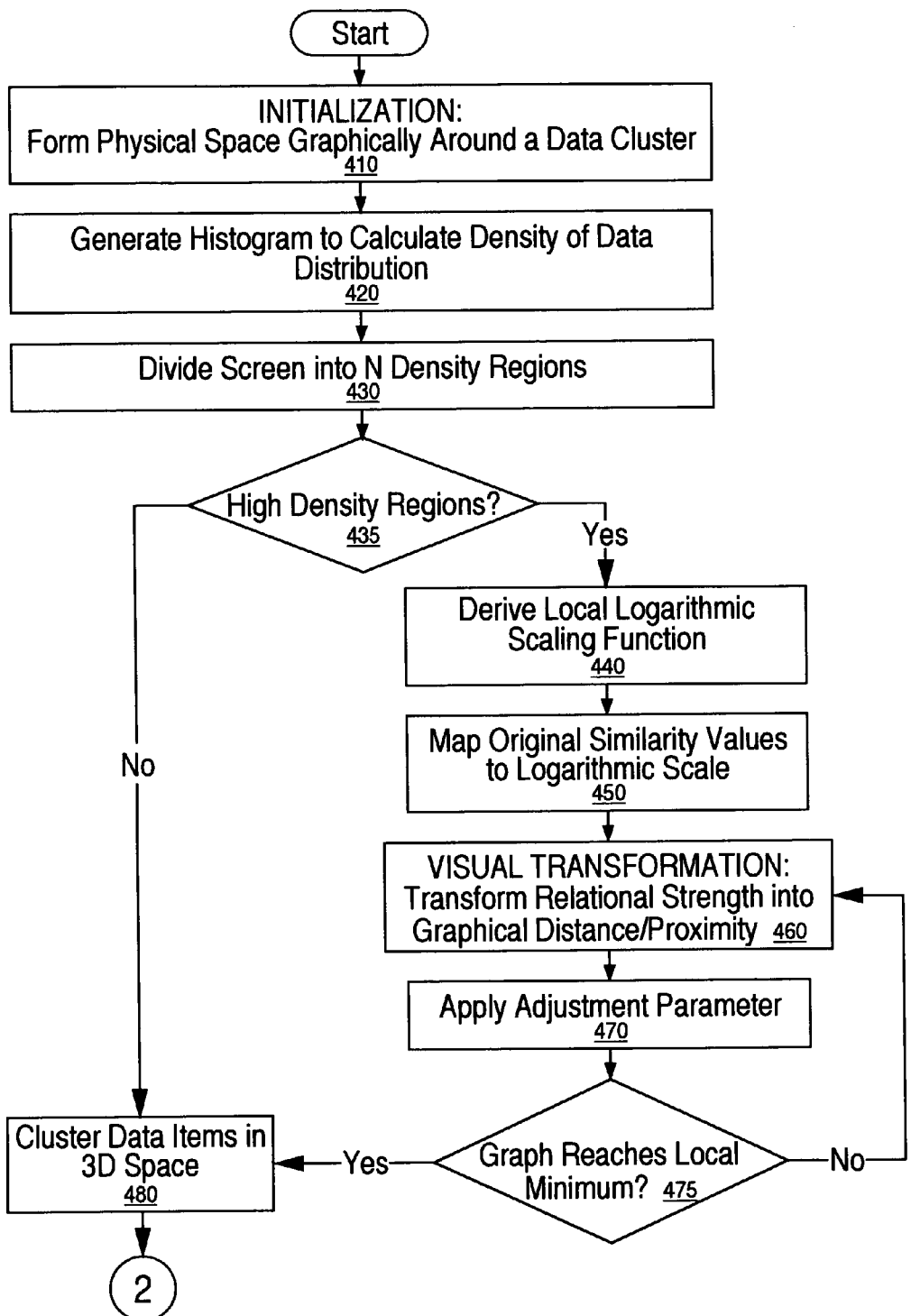
FIG. 4A is a flow chart of the initial steps in a process for effectuating non-linear visual space transformations (NLVST), according to one embodiment of the present invention.
Figure 4B:
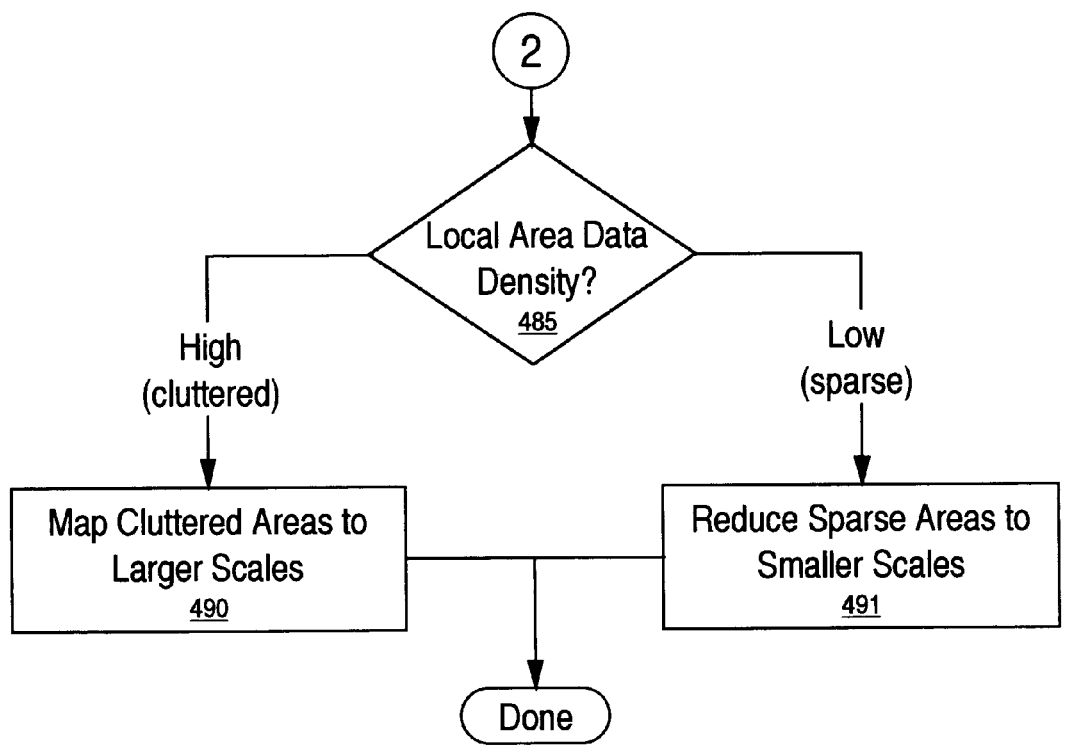
FIG. 4B is a continuation of FIG. 4A, completing the flow chart shown therein by describing the final steps in a process for effectuating NLVST, according to one embodiment of the present invention.

The foregoing visual transformations effectuating NLVST, in one embodiment of the present invention, are effectuated by a process 400 as described in the flowchart of FIGS. 4A and 4B. This flowchart is distributed over both FIGS. 4A and 4B for purposes of clarity, e.g., so as not to unnecessarily clutter the illustration into a single sheet. No separation of processes is implied or to be inferred from this separation.

With reference to FIG. 4A, Process 400 begins with step 410, wherein initialization of the process commences with the formation of physical spaces such as spheres and/or ellipsoids (e.g., spaces 301A, 301B; FIGS. 3A, 3B, respectively), graphically about a data cluster.

In step 420, a histogram (e.g., histogram 200B; FIG. 2B) is generated (e.g., produced, promulgated) to calculate the density of the data distribution subject to analysis.

From the data distribution density so calculated, a screen upon which the data is to be displayed is divided into a number N of density regions; step 430. The number N corresponds to the number of identifiable differences in the level of data density calculated upon generation of the histogram. In step 435, it is determined whether areas of high data density exist. If it is determined that areas of high data density do exist, a local logarithmic scaling function is derived; step 440. The local logarithmic scaling function is derived from the ratio of the current data density over the range of the minimum and maximum tightness of the relationships.

In step 450, NLVST process 400 applies a non-linear visual space transformation algorithm for high density areas to map original similarity values (relationship tightness) to a logarithmic scale before clustering the data items in a 3D space.

Actual visual transformation takes place in step 460, wherein relational strength is transformed into graphical stiffness, e.g., degree of distance/proximity. In this way, graphical distance and/or proximity visually indicates the strength of the relationship between data items.

A small modifier Δ is applied as an adjustment parameter. Modifier Δ is applied to adjust the graphing to prevent any portion of the graph being produced from approaching infinity, e.g., going off scale. It is determined in step 475 whether any portions of the graph being produced will reach a local minimum. If it is determined that a portion of the graph reaches a local minimum, then in step 480, the data items are clustered correspondingly in three dimensional (3D) space.

If on the other hand, it is determined that no portion of the graph reaches a local minimum, process 400C loops back to step 460, wherein visual transformation is repeated, as described above. At circled point 2, process 400 proceeds as described on FIG. 4B.

With reference now to FIG. 4B, in step 485, it is determined how various local areas of the graph being produced are to be mapped, according to their individual data densities. If it is determined that a particular area has a high density, e.g., that it is cluttered, then in step 490, the cluttered high density area is mapped to a larger scale corresponding to the level of its density.

If it is determined in step 485 that a particular area has a low density, e.g., that it is sparse, then in step 491, the sparse low density area is reduced to a smaller scale corresponding to the level of its density. Upon completion of mapping by execution of step 490 and/or 491, process 400 is complete.

To visually represent non-uniform data with a wide range of values to analysts who must make use of them, optimization of scaling is desirable. Some data distributions exhibit large dynamics with few extremely high values and many extremely low values. Thus, it is hard to visualize each of these values on a linear scale.

Figure 5A:
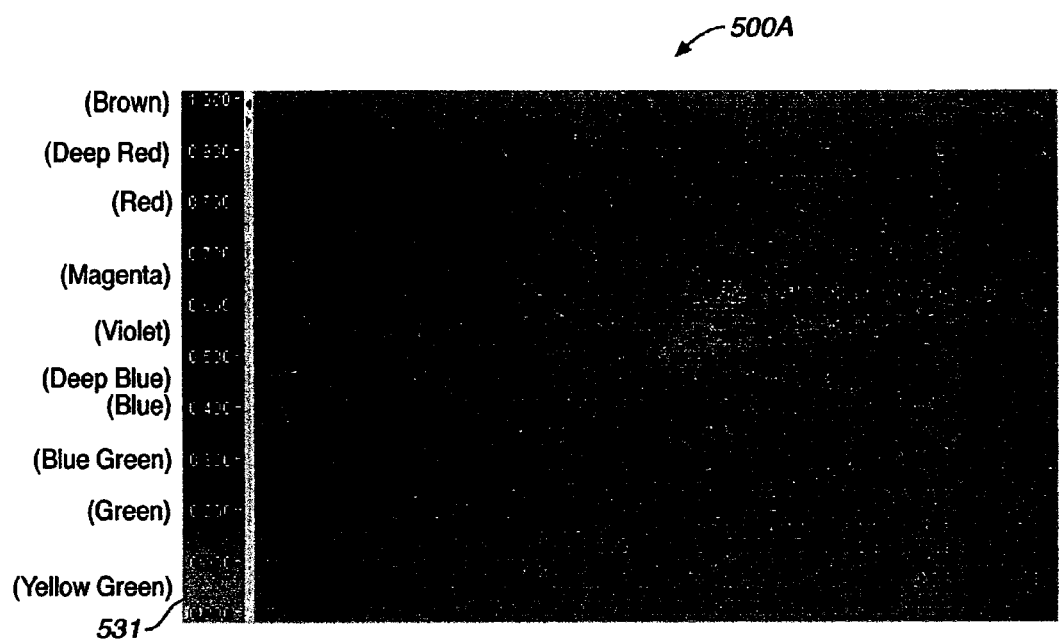
FIG. 5A depicts local scale optimization before non-linear visual space transformation in accordance with an embodiment of the present invention.

With reference to FIG. 5A, edges 507A between data are depicted on an exemplary display 500A, prior to any application of NLVST by an embodiment of the present invention. A vertical scale 531 appears at the left side of display 500A. Scale 531 ranges from 0.000 at the lowest part of display 500A, in equal linear increments, up to a maximum of 1.000 at the top of the scale, corresponding to relational values of interest to the analyst.

These values arrayed along scale 531 are color coded from one end of the scale to the other. The values on scale 531 are thus encoded into equivalent signifying colors. The color of edges 507A are thus defined by the corresponding color on the valuation scale 531. In the present embodiment, the colors are valued as shown in Table 1 below.

TABLE 1

| VALUE | COLOR |
| --- | --- |
| 1.000 | Brown |
| 0.900 | Deep Red |
| 0.800 | Red |
| 0.700 | Magenta |
| 0.600 | Violet |
| 0.500 | Deep Blue |
| 0.400 | Blue |
| 0.300 | Green-Blue |
| 0.200 | Deep Green |
| 0.100 | Green |
| 0.000 | Yellow-Green |

It is seen that all the similarity edges 507A are colored identically or nearly so, due to the non-uniformed dataset. In the present example, edges 507A almost all have a yellow-green color, reflecting substantially close low values, centered between 0.000 and 0.100. Thus, the analytical usefulness of display 500A is limited, as in the pseudo-coloring schemes of the prior art.

Figure 5B:
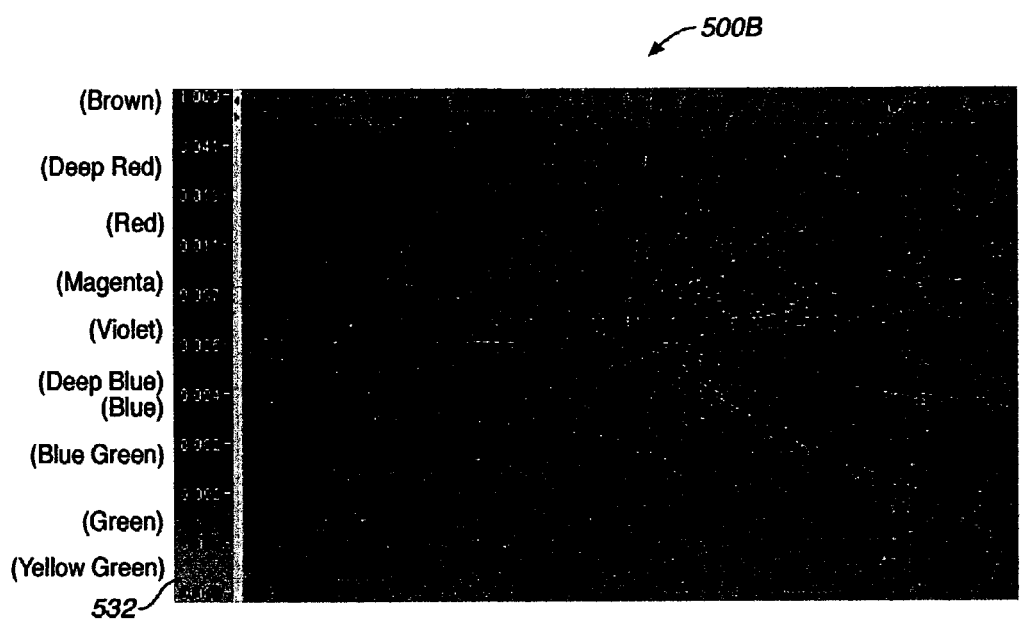
FIG. 5B depicts the local scale optimization shown in FIG. 4A, after non-linear visual space transformation, in accordance with one embodiment of the present invention.

In one embodiment of the present invention however, an automated scaling optimization for non-uniform data with a wide range of values is effectuated by application of NLVST. With reference to FIG. 5B, edges 507B between data are depicted on an exemplary display 500B by application of an exemplary optimizing transform. In the present example, NLVST automatically optimizes the low range values on a non-linear scale according to their local density. After these transformations, the low-value data items can be identified and visualized, as illustrated in FIG. 5B.

With reference to FIG. 5B, edges 507B between data are depicted on an exemplary display 500B by application of a coloring scheme effectuated according to the present embodiment. A vertical scale 532 appears at the left side of display 500B. Scale 532 ranges from 0.000 at the lowest part of display 500B up to a maximum of 1.000 at the top of the scale, corresponding to relational values of interest to the analyst.

However, unlike the single color scheme of display 500A (FIG. 5A), the value increments of scale 532 are not linear. These non-linearly increasing values (from low/bottom to high/top) arrayed along scale 532 are color coded from one end of the scale to the other. The values on scale 532 are thus encoded into equivalent signifying colors. The color of edges 507A are thus now defined, in the present example, by the corresponding enhanced color on the valuation scale 532. In the present example, the colors are valued as shown in Table 2 below.

TABLE 2

| VALUE | COLOR |
|---|---|
| 1.000 | Brown |
| 0.041 | Deep Red |
| 0.018 | Red |
| 0.011 | Magenta |
| 0.007 | Violet |
| 0.006 | Deep Blue |
| 0.004 | Blue |
| 0.003 | Green-Blue |
| 0.002 | Deep Green |
| 0.001 | Green |
| 0.000 | Yellow-Green |

As can be seen from scale 532, the values are arrayed in a substantially logarithmic sequence; they are decidedly non-linear. This renders edges 507B, as displayed on graph 500B, in a multitude of colors spanning the pseudo-spectrum delineated by scale 532.

After these transformations, the low-value data items related by edges 507B can be identified and visualized, as illustrated in FIG. 5B. Thus, similarity between data items are transformed into a relative density, which is reflected in a scale subdivided non-linearly, in one embodiment, logarithmically, and visually represented by corresponding color variation. Advantageously, this formats the graphical information displayed thereon in a manner much more conducive to visual analysis and related analytical usefulness.

The exemplary coloring scheme herein is for illustration purposes only. It is not meant to be exclusive of any other possible coloring schemes, and/or visual coding by methods other than color. It is appreciated that any color coding scheme and/or visual coding may be applied in various embodiments of the present invention.

There are many e-commerce applications that can adopt the non-linear visual space transformations for visualizing high-density 3D graphs. Three exemplary such data mining visualization applications of these mechanisms include market basket analysis, user profiling, and IT resource searching. FIG. 5B illustrates the use of the NLVST visualization approach for market basket analysis of real data taken from a Hewlett-Packard Corporation (Palo Alto, Calif.) on-line shopping web site.

The cubic vertices ending edges 507B represent products. The distances between products, e.g., the length of the edges 507B, represent the frequency of product items bought together. In the present example, from 356,000 e-commerce transactions therein, there are about 1,000 different products (represented as cubic) and 21,100 active edges (e.g., line) 507B. The color of the edge is used to show the closeness of similarities.

After performing non-linear visual space transformations, business analysts are able to navigate high-density 3D graphs generated from their real data and answer questions on which product groups are frequently bought together, and how strong the correlations are. In the meantime, business analysts can "click" on a product to find its relationship with other products using different scales according to their densities. This is illustrated in FIG. 3B and FIG. 5B in different visually representative graphical configurations.

Figure 6:
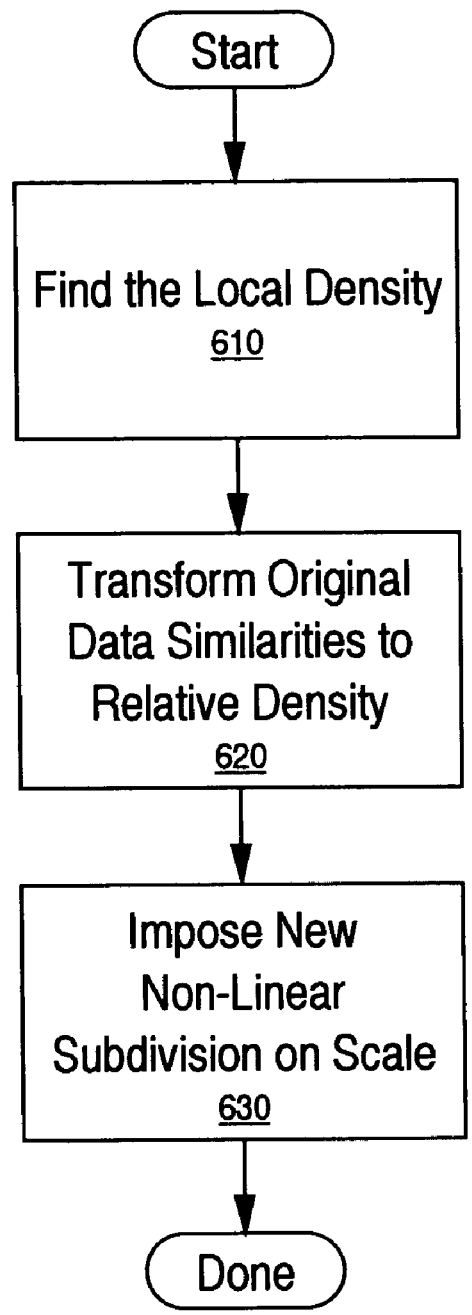
FIG. 6 is a flow chart of the steps in a process for effectuating an scale optimization for enhancing NLVST, according to one embodiment of the present invention.

Local scale optimization, in one embodiment of the present invention, proceeds according to a method 600 as described in the flowchart of FIG. 6. Local scale optimization per method 600 begins with step 610, wherein the local data density of a graphical area subject to analysis is determined.

Upon finding the local density, in step 620, original data similarities are transformed to the relative density. This transformation proceeds according to a local optimization scale function f. Local optimization scale function f is given by the following equation 1.

$$f = \frac{\left(\begin{array}{l}\text{number of edges with similarity} \leq \\ \text{similarity of the current data item}\end{array}\right)}{\text{total number of edges}} \quad \text{Equation 1}$$

After transformation of the original data similarities to the relative density, a new non-linear subdivision is imposed on the scale in step 630, completing process 600.

In one embodiment, relational strength between data items is transformed into color differences (e.g., FIG. 5B) and graphical distances (e.g., FIG. 3B), based on local and global views, respectively. Advantageously, this renders the relationships between the data items graphically clear on both a global and a local scale.

In one embodiment of the present invention, NLVST processes are effectuated as an expression of client-server system 700 as a Java-based model. In one embodiment, NLVST platform client-server model 700 is built on a VisMine, e.g., visual mining platform (e.g., see M. Hao, et al. "A Java-based Visual Mining Infrastructure and Applications," IEEE InfoVis99, CA, 1999). Such a visual mining platform may use, in one embodiment, computer serving as a web browser, with a Java activator that allows the user to mine large volumes of transaction data. The Web interfaces are based, in one embodiment, on standard HTML and the use of Java applets. The user at the client side visually mines the knowledge results, with ease of visualization effectuated by NLVST processes per embodiments, as discussed herein.

Non-linear visual space transformation is useful in market basket analysis and to Web access observation and analysis. One problem in Web analysis is application of Web transaction history to discover clients causing network bottlenecks. NLVST can be applied to visually analyze clients' Web behavior with respect to response time.

Figure 7:
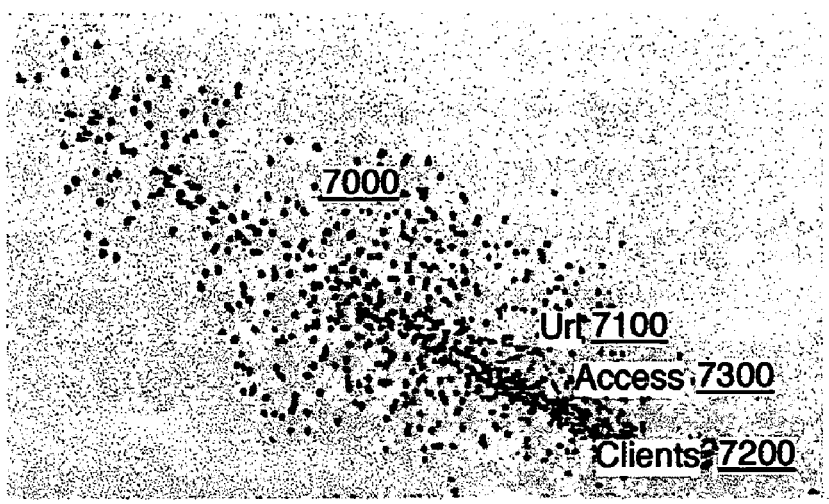
FIG. 7 depicts a NLVST arranged graph of Web access observation, according to one embodiment of the present invention.

FIG. 7 depicts a graph generated from a Web transaction observation data set. The graph displayed therein contains 35,000 transaction records 7000, representing 986 clients with over 2,000 Universal Resource Locators (URLs) 7100. Each point 7200 represents clients with similar response times making transactions on the Web. The URLs 7300 accessed by these clients are placed through NLVST around these clients. Thus by clicking on any of the clients, the URLs they access can be easily determined.

Advantageously, such NLVST optimizes the visual mining of information by analysts and others making business decisions, and this has useful application in electronic business applications, including but not limited to market basket analysis, customer profiling, and IT resource management. It may also be useful in other fields related by the applicability of visual mining of information, including but not limited to epidemiology, operations research, and logistics.

An embodiment of the present invention, a method for visualizing high density graphical data sets for display, is thus described. While the present invention has been described in particular embodiments, it should be appreciated that the present invention should not be construed as limited by such embodiments, but rather construed according to the following claims.

What is claimed is:

1. A method of visualizing graphical data points for display comprising:
    determining a graphical density corresponding to an area, of said display wherein said graphical density is of a non-uniform nature;
    processing a non-linear visual space transformation corresponding to said graphical density, said processing including a spatial transformation sub-module for transforming a distance representing a relationship between items comprising said graphical data points to render the display of said relationship with greater resolution, mapping areas of higher density of said grahpical data points to a first scale, and mapping areas of lower density of said graphical data points to a second scale, the second scale being smaller than the first scale to improve visual resolution; and
    displaying said area with increased resolution.

2. The method as recited in claim 1, further comprising stretching an area of higher density and compressing an area of lower density.

3. The method as recited in claim 2, wherein said stretching comprises a first method and an Nth method applied to separate areas of said representation, said first method and said Nth method selected corresponding to said graphical density characterizing each said area of said representation.

4. The method as recited in claim 1, wherein said displaying further comprises reflecting a similarity between said data on a scale subdivided non-linearly, wherein said scale is visually represented by corresponding color variation.

5. A computer-implemented automated system, comprising
    a density analysis module that analyzes the density of graphical data points over a plurality of areas; and
    a transformation module for transforming said graphical data points spatially, wherein said transformation module performs a non-linear visual space transformation and both stretches an area of higher density of said graphical data points and tightens an area of lower density of said graphical data points to unclutter graphical data for display;
    wherein said transformation module further comprises:
    a spatial transformation sub-module that transforms a distance representing a relationship between items comprising said graphical data points to render the display of said relationship with greater resolution; and
    a scale subdividing sub-module that transforms visual gradations representing a similarity value between said items to render said similarity value with greater resolution.

6. The system as recited in claim 5 wherein said density analysis module generates a histogram corresponding to a spatial distribution of said density.

7. The system as recited in claim 5 wherein said non-linear visual space transformation comprises a logarithmic function.

8. The system as recited in claim 5 wherein said spatial transformation sub-module transforms said distance by selectively stretching and tightening said distance.

9. The system as recited in claim 8 wherein said stretching is performed to transform a relatively close said distance and wherein said tightening is performed to transform a relatively far said distance.

10. The system as recited in claim 5 wherein said scale subdividing sub-module transforms said visual gradations by adjusting a scale.

11. A computer-implemented method comprising:
    providing a dataset comprising a data distribution arrayed non-uniformly with respect to density for display;
    stretching a high display data density area comprising said dataset with a graphical representation of said high display data density area;
    scaling said graphical representation of said dataset to correspondingly reflect a similarity between data on a plurality of corresponding scales; and
    arranging said graphical representation;
    wherein said stretching a high display data density area comprises;
    calculating the density of said data distribution;
    dividing said display into N density regions;
    determining, selectively, the presence and absence of a region of high density;
    clustering data items Into clusters displayed in a three dimensional space upon said display;
    determining areas of selectively high and low data density; and
    selectively scaling said areas of high and low data density upon a scale accordingly.

12. The method as recited in claim 11, wherein said calculating the density of said data distribution comprises generating a corresponding histogram 13. The method as recited in claim 11 wherein, upon said determining said. presence of said region of high density, said method further comprises:
    deriving a local scaling function to generate a corresponding scale;

mapping a plurality of original similarity values to said corresponding scale; and determining that, selectively, said graphical representation reaches and does not reach infinity.

14. The method as recited in claim 13, wherein said corresponding scale comprises a logarithmic scale.

15. The meted as recited in claim 13 wherein, upon said determining that said graphical representation reaches infinity, said method further comprises applying an adjustment parameter to prevent said graphical representation from displaying infinity.

16. The method as recited in claim 11, wherein said scaling said graphical representation of said dataset to correspondingly reflect a similarity between said data on said plurality of corresponding scales comprises:

finding a local density;

transforming a plurality of original similarity values to a corresponding cumulative density; and imposing a new subdivision on said scale.

17. The method as recited in claim 16, wherein said new subdivision is a non-linear subdivision.

18. The method as recited in claim 17, wherein said non-linear subdivision is a logarithmic subdivision.

19. The method as recited In claim 11, wherein said scale is visually represented by gradations selected from the group consisting of color, grayness, brightness, contrast, and shading.

* * * * *

UNITED STATES PATENT AND TRADEMARK OFFICE
CERTIFICATE OF CORRECTION

PATENT NO. : 7,046,247 B2  Page 1 of 1
APPLICATION NO. : 10/146974
DATED : May 16, 2006
INVENTOR(S) : Ming C. Hao et al.

It is certified that error appears in the above-identified patent and that said Letters Patent is hereby corrected as shown below:

In column 11, line 39, in Claim 1, after "area" delete ",".

In column 11, line 49, in Claim 1, delete "grahpical" and insert -- graphical --, therefor.

In column 12, lines 1-2, in Claim 5, after "comprising" insert -- : --.

In column 12, line 11, in Claim 5, after "data" insert -- points --.

In column 12, line 49, in Claim 11, delete "comprises;" and insert -- comprises: --, therefor.

In column 12, line 54, in Claim 11, delete "Into" and insert -- into --, therefor.

In column 12, line 62, in Claim 12, after "histogram" insert -- . --.

In column 12, line 64, in Claim 13, after "said" delete ".".

In column 13, line 7, in Claim 15, delete "meted" and insert -- method --, therefor.

In column 14, line 10, in Claim 19, delete "In" and insert -- in --, therefor.

Signed and Sealed this

Second Day of June, 2009

JOHN DOLL
*Acting Director of the United States Patent and Trademark Office*